Patented Nov. 5, 1929

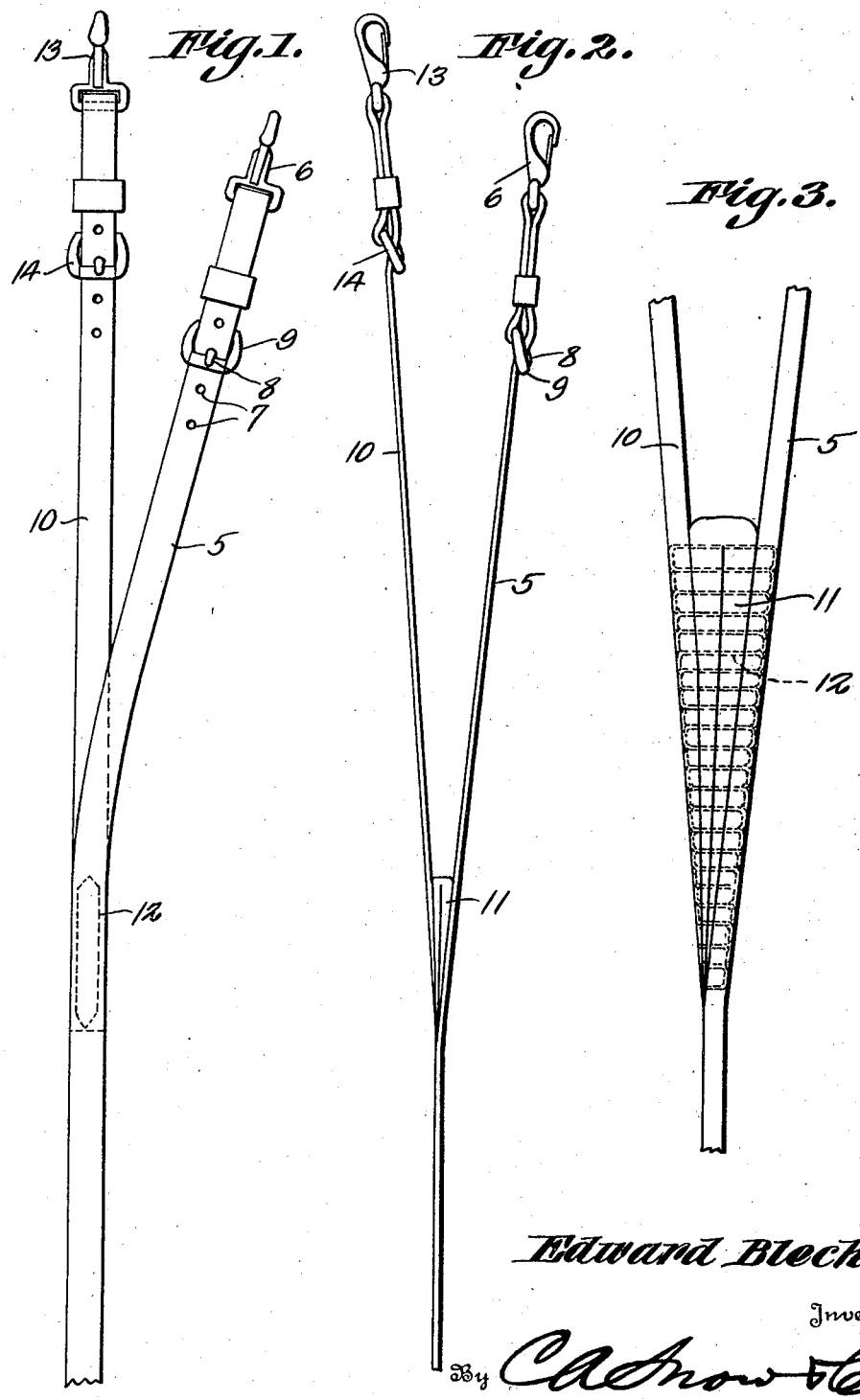

1,734,195

UNITED STATES PATENT OFFICE

EDWARD BLECHA, OF HUMBOLDT, NEBRASKA

HARNESS CONSTRUCTION

Application filed May 2, 1929. Serial No. 359,837.

In harness construction it is usual to connect the inner check lines of the reins of double harness by a buckle so that an adjustment of the inner check lines may be readily made. These buckles are objectionable because they catch in fly nets worn by the animal and render driving difficult.

It is therefore the primary object of the present invention to provide check lines connected to the main lines in such a way that buckles or other enlargements which could catch in fly nets worn by the animals, or with other parts of the harness, are eliminated, the adjustment being made at the outer ends or snap hook ends of the lines.

Another important object of the invention is to provide a connection between the reins or driving lines of a harness and the check lines thereof to insure a more direct pull on the connections between the main lines and check lines, eliminating wear on the connection which usually results in the check lines breaking loose from the main lines.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view illustrating a rein of a harness as equipped with a check line constructed in accordance with the invention.

Figure 2 is a view illustrating the edge thereof.

Figure 3 is an enlarged detail view illustrating the manner of connecting a check line to a main line or rein.

Referring to the drawing in detail, the reference character 5 designates a rein or line of a harness, the outer end thereof being supplied with the usual snap hook 6 by means of which the rein may be connected to a bit ring. The line is provided with holes 7 to receive the tongue 8 of the buckle 9 secured to the end of the line, so that an adjustment of the line may be readily made.

The reference character 10 designates a check line which is connected to the main line in such a way that the pull exerted on the check line will be direct, and not a lateral pull which usually results in breaking the stitches connecting the check lines to main lines of harness when the check lines are connected in the usual and well known manner.

A length of leather is positioned between the line and check line, and as shown this length of leather is bent upon itself and tapered to provide a wedge 11 which is held in position by means of the stitching 12. Thus it will be seen that due to this construction, the check line is separated from the main line in such a way that a wide space is provided at the point of connection between the lines eliminating any possibility of portions of the fly net used with the harness, catching between the lines, and at the same time supporting the check lines at such an angle that a direct pull will be exerted on the check line, relieving the connection of lateral strain.

At the outer end of the check line 10, is a snap hook 13 which is adjustably secured to the check line 10 by means of the buckle 14.

I claim:

1. A harness rein including a main line, a check line secured to the main line, a wedge shaped member disposed between the lines and secured thereto at the point where the check line connects with the main line, and snap hooks at the outer ends of the lines.

2. A harness rein including a main line, a check line secured to the main line, means disposed between the lines for separating the lines at the point where they are secured, and snap hooks adjustably secured to the free ends of the lines.

3. A harness rein including a main line, a check line, a wedge shaped member disposed between the lines and secured to the lines to hold the lines spaced apart, and means at the outer ends of the lines for securing the lines to a bit.

4. A harness rein including a main line, a check line, a length of leather material bent intermediate its ends and tapered to provide a wedge, disposed between the lines to space the lines apart, and a line of stitching extending through the lines and wedge to secure them together.

In testimony that I claim the foregoing as my own, I have hereto affixed my signature.

EDWARD BLECHA.